US011153219B2

(12) United States Patent
Farrell et al.

(10) Patent No.: US 11,153,219 B2
(45) Date of Patent: Oct. 19, 2021

(54) SYSTEM FOR APPLICATION AWARE RATE-LIMITING USING PLUG-IN

(71) Applicant: International Business Machines Corporation, Armonk, NY (US)

(72) Inventors: Leo M. M. Farrell, Main Beach (AU); Shane B. Weeden, Paradise Point (AU)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 16/105,618

(22) Filed: Aug. 20, 2018

(65) Prior Publication Data
US 2020/0059471 A1 Feb. 20, 2020

(51) Int. Cl.
*H04L 12/859* (2013.01)
*H04L 29/06* (2006.01)
*G06F 9/445* (2018.01)
*H04L 29/08* (2006.01)

(52) U.S. Cl.
CPC ...... *H04L 47/2475* (2013.01); *G06F 9/44526* (2013.01); *H04L 63/0209* (2013.01); *H04L 63/10* (2013.01); *H04L 67/02* (2013.01)

(58) Field of Classification Search
CPC . H04L 47/2475; H04L 47/22; H04L 63/0209; H04L 63/0245; H04L 63/0254; H04L 63/10; H04L 63/1425; H04L 63/1458; H04L 67/02; G06F 9/44526
See application file for complete search history.

(56) References Cited

U.S. PATENT DOCUMENTS

| 7,484,011 | B1 | 1/2009 | Agasaveeran et al. |
| 7,848,011 | B2 | 12/2010 | Furuya et al. |
| 8,086,732 | B1 | 12/2011 | Volz et al. |
| 8,671,385 | B2 * | 3/2014 | Byrd ................. G06F 21/45 717/100 |
| 8,863,266 | B1 * | 10/2014 | Sanyal ............... H04L 63/1441 726/9 |

(Continued)

OTHER PUBLICATIONS

Roberto Picanco, A Simple Way to Implement Rate Limiting, Mar. 12, 2017 https://dzone.com/articles/a-simple-way-to-implement-rate-limiting.

(Continued)

*Primary Examiner* — Theodore C Parsons
(74) *Attorney, Agent, or Firm* — Terrile, Cannatti & Chambers, LLP; Stephen A. Terrile

(57) ABSTRACT

A method, system and computer-usable medium for web application aware rate-limiting. One embodiment of the system involves a computer-implemented method in which requests for a web application are receive from a plurality of client entities. When the received requests are to be rate-limited, a rate-limiting identifier is requested from a plug-in respectively associated with the web application. The plug-in generates the rate-limiting identifier, wherein the rate-limiting identifier is unique to the web application. The plug and sends the rate-limiting identifier to the rate-limiting engine, which uses the rate-limiting identifier to rate-limit passing of the received requests to the web application. In some embodiments, the rate-limiting identifier is generated as a hash value that is independent of IP address and header information data of the client making the request.

20 Claims, 7 Drawing Sheets

(56) References Cited

U.S. PATENT DOCUMENTS

| | | |
|---|---|---|
| 9,526,086 B1 | 12/2016 | Barbee et al. |
| 9,654,483 B1 | 5/2017 | Benson et al. |
| 2010/0322071 A1 | 12/2010 | Avdanin et al. |
| 2011/0040830 A1* | 2/2011 | Kumar .................... H04L 67/02 709/203 |
| 2015/0120808 A1* | 4/2015 | Bielski ................. H04L 67/325 709/203 |
| 2015/0229579 A1 | 8/2015 | Kosim-Satyaputra et al. |
| 2019/0132203 A1* | 5/2019 | Wince ................... G06F 16/215 |

OTHER PUBLICATIONS

Cloudflare, Cloudflare Rate Limiting, Dec. 6, 2017 https://support.cloudflare.com/hc/en-us/articles/235240767-Cloudflare-Rate-Limiting.

NGINX, Rate Limiting with NGINX and NGINX Plus, Jun. 12, 2017 https://www.nginx.com/blog/rate-limiting-nginx/.

Rob High, "The Era of Cognitive Systems: An Inside Look at IBM Watson and How it Works," IBM Redbooks, 2012.

Michael Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

SYSTEM FOR APPLICATION AWARE RATE-LIMITING USING PLUG-IN

BACKGROUND OF THE INVENTION

Field of the Invention

The present invention relates in general to the field of computers and similar technologies, and in particular to software utilized in this field. Still more particularly, it relates to a method, system and computer-usable medium for implementing application aware rate-limiting using an application plug-in.

Description of the Related Art

Rate-limiting is commonly used when accepting requests for a web application employing publicly accessible web APIs. This rate-limiting is often one of the first things performed when a web request is made to a web service. Conventional rate-limiting typically performed by a perimeter device like an API gateway or service such as Cloudflare®. Such perimeter devices are specifically designed for taking a high volume of data traffic and distributing the data across a cluster of application nodes. Additionally, such perimeter devices often include other services which lay at the perimeter of the network (i.e., IP blacklists, URL mapping from public to internal URLs, transformation services, load balancing).

Existing rate-limiting techniques, in general, are not particularly aware of any web applications. While existing techniques may be configured to rate-limit based on a particular piece of request data, such as the incoming IP address or a header, such techniques are not capable of identifying abuse when it occurs at the application level. For example, in a distributed denial-of-service attack (DDoS attack), the incoming traffic flooding the network system originates from many different outside sources having different IP addresses and headers. In some instances, these different sources focus their attack on one or more web applications by concurrently submitting a substantial number requests for the web application from sources having different IP addresses and/or headers. This effectively makes it difficult or impossible to stop the attack simply by blocking a single source.

Other such attacks may exploit OAuth refresh token flow, by which a client presents a refresh token in exchange for a new access token and refresh token. If the authorization grant is being abused by an outside entity, it may not be possible to determine from any one request that the same grant has been used recently in rapid succession. Because the token rolls on every request, the API gateway has no knowledge that the grant is being abused.

SUMMARY OF THE INVENTION

A method, system and computer-usable medium are disclosed for web application aware rate-limiting. One embodiment of the system involves a computer-implemented method in which requests for a web application are receive from a plurality of client entities. When the received requests are to be rate-limited, a rate-limiting identifier is requested from a plug-in respectively associated with the web application. The plug-in generates the rate-limiting identifier, wherein the rate-limiting identifier is unique to the web application. The plug-in sends the rate-limiting identifier to the rate-limiting engine, which uses the rate-limiting identifier to rate-limit passing of the received requests to the web application. In some embodiments, the rate-limiting identifier is generated as a hash value that is independent of IP address and header information data of the client making the request.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
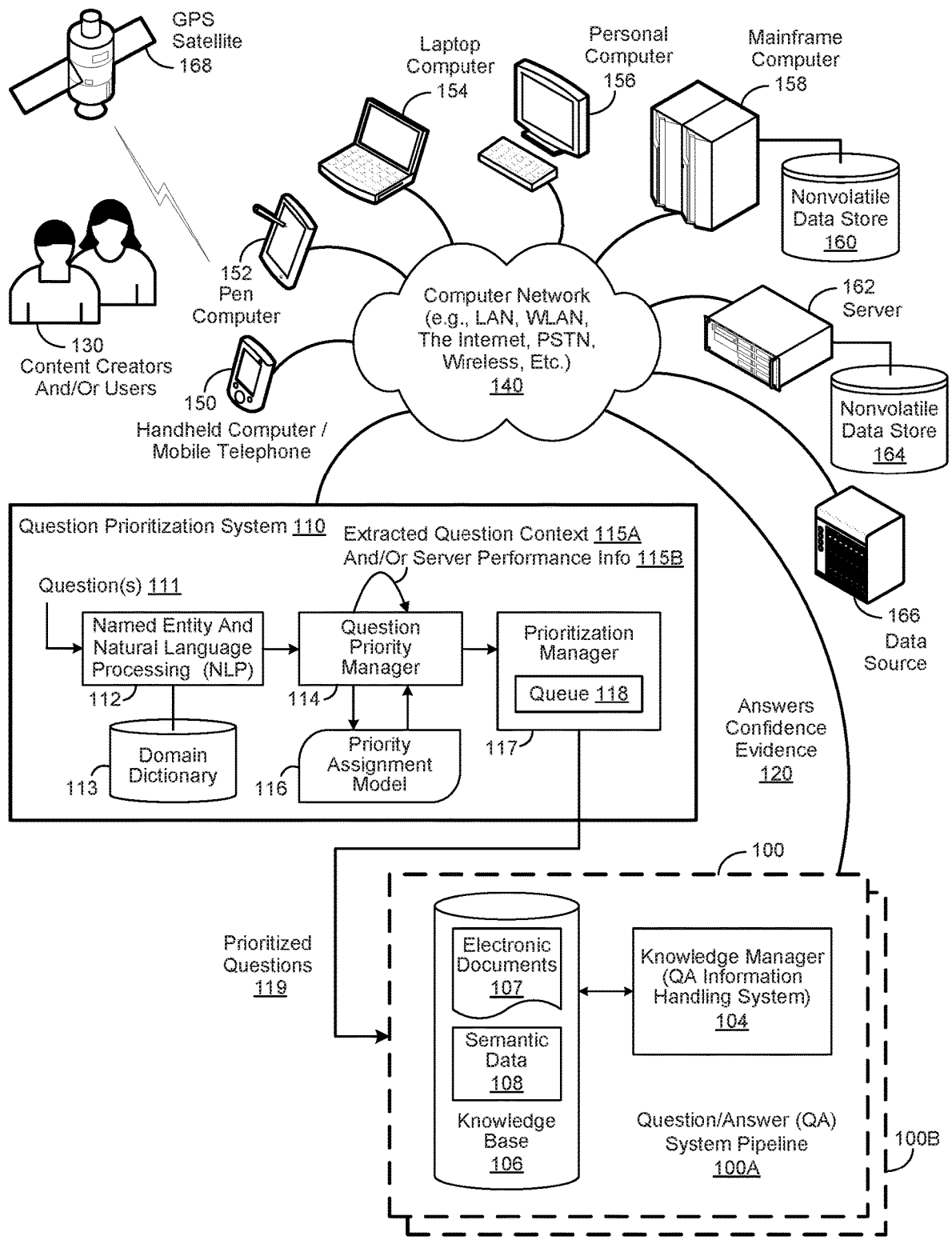
FIG. 1 shows a schematic diagram of one illustrative embodiment of a question/answer (QA) system.

Various aspects of the present disclosure include an appreciation that current rate-limiting operations allow abuse of requests to a web application by threats that provide the requests using multiple, different IP addresses and headers. In order to protect the web application from such threats, certain disclosed embodiments use a plug-in of the web application to generate a rate-limiting key that is unique to the web application. The rate-limiting key is may use conventional rate-limiting algorithms to rate-limit requests provided to the web application and thereby assist in protecting and/or mitigating abuse of requests to the web application using conventional rate-limiting algorithms. As such, rate-limiting of requests to the web application occurs at an application level thereby making the rate-limiting operations application aware.

The present invention may be a system, a method, and/or a computer program product. In addition, selected aspects of the present invention may take the form of an entirely hardware embodiment, an entirely software embodiment (including firmware, resident software, microcode, etc.), or an embodiment combining software and/or hardware aspects that may all generally be referred to herein as a "circuit," "module" or "system." Furthermore, aspects of the present invention may take the form of computer program product embodied in a computer-readable storage medium, or media, having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a dynamic or static random access memory (RAM), a read-only memory (ROM), an erasable programmable read-only memory (EPROM or Flash memory), a magnetic storage device, a portable Compact Disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer-readable program instructions may execute entirely on the user's computer, partly on the user's computer, as a stand-alone software package, partly on the user's computer and partly on a remote computer, or entirely on the remote computer or server or cluster of servers. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a schematic diagram of one illustrative embodiment of a QA system 100 and a question prioritization system 110 connected to a computer network 140. The QA system 100 includes a knowledge manager 104 that is connected to a knowledge base 106 and configured to provide QA generation functionality for one or more content creators and/or users 130 who submit content across the network 140 to the QA system 100. To assist with efficient sorting and presentation of questions to the QA system 100, the question prioritization system 110 may be connected to the computer network 140 to receive user questions, and may include a plurality of sub-systems which interact with cognitive systems, like the QA system 100, to prioritize questions or requests being submitted to the QA system 100.

The Named Entity sub-system 112 receives and processes each question 111 by using natural language processing (NLP) to analyze each question and extract question topic information contained in the question, such as named entities, phrases, urgent terms, and/or other specified terms which are stored in one or more domain entity dictionaries 113. By leveraging a plurality of pluggable domain dictionaries 113 relating to different domains or areas (e.g., travel, healthcare, electronics, game shows, financial services, etc.), the domain dictionary 113 enables critical and urgent words (e.g., "threat level") from different domains (e.g., "travel") to be identified in each question based on their presence in the domain dictionary 113. To this end, the Named Entity sub-system 112 may use an NLP routine to identify the question topic information in each question. As used herein, "NLP" broadly refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 113.

The Question Priority Manager sub-system 114 performs additional processing on each question to extract question context information 115A. In addition, or in the alternative, the Question Priority Manager sub-system 114 may also extract server performance information 115B for the question prioritization system 110 and/or QA system 100. In selected embodiments, the extracted question context information 115A may include data that identifies the user context and location when the question was submitted or received. For example, the extracted question context information 115A may include data that identifies the user who submitted the question (e.g., through login credentials), the device or computer which sent the question, the channel over which the question was submitted, or any combination thereof. Other examples may include the location of the user or device that sent the question, any special interest location indicator (e.g., hospital, public-safety answering point, etc.), other context-related data for the question, or any combination thereof. In certain embodiments, the location information is determined through the use of a Geographical Positioning System (GPS) satellite 168. In these embodiments, a handheld computer or mobile telephone 150, or other device, uses signals transmitted by the GPS satellite 168 to generate location information, which in turn is provided via the computer network 140 to the Question Priority Manager sub-system 114 for processing.

In various embodiments, the source for the extracted context information 115A may be a data source 166 accessed through the computer network 140. Examples of a data source 166 include systems that provide telemetry information, such as medical information collected from medical equipment used to monitor a patient's health, environment information collected from a facilities management system, or traffic flow information collected from a transportation monitoring system. In certain embodiments, the data source 166 may be a storage area network (SAN) or other network-based repositories of data.

In various embodiments, the data source 166 may provide data directly or indirectly collected from "big data" sources. In general, big data refers to a collection of datasets so large and complex that traditional database management tools and data processing approaches are inadequate. These datasets can originate from a wide variety of sources, including computer systems (e.g., 156, 158, 162), mobile devices (e.g., 150, 152, 154), financial transactions, streaming media, social media, as well as systems (e.g., 166) commonly associated with a wide variety of facilities and infrastructure (e.g., buildings, factories, transportation systems, power grids, pipelines, etc.). Big data, which is typically a combination of structured, unstructured, and semi-structured data poses multiple challenges, including its capture, curation, storage, transfer, search, querying, sharing, analysis and visualization.

The Question Priority Manager sub-system 114 may also determine or extract selected server performance data 115B for the processing of each question. In certain embodiments, the server performance information 115B may include operational metric data relating to the available processing resources at the question prioritization system 110 and/or QA system 100, such as operational or run-time data, CPU utilization data, available disk space data, bandwidth utilization data, and so forth. As part of the extracted information 115A/B, the Question Priority Manager sub-system 114 may identify the Service Level Agreement (SLA) or Quality of Service (QoS) processing requirements that apply to the question being analyzed, the history of analysis and feedback for the question or submitting user, and the like. Using the question topic information and extracted question context 115A and/or server performance information 115B, the Question Priority Manager sub-system 114 is configured to populate feature values for the Priority Assignment Model 116. In various embodiments, the Priority Assignment Model 116 provides a machine learning predictive model for generating target priority values for the question, such as by using an artificial intelligence (AI) approaches known to those of skill in the art. In certain embodiments, the AI logic is used to determine and assign a question urgency value to each question for purposes of prioritizing the response processing of each question by the QA system 100.

The Prioritization Manager sub-system 117 performs additional sort or rank processing to organize the received questions based on at least the associated target priority values such that high priority questions are put to the front of a prioritized question queue 118 for output as prioritized questions 119. In the question queue 118 of the Prioritization Manager sub-system 117, the highest priority question is placed at the front of the queue for delivery to the assigned QA system 100. In selected embodiments, the prioritized questions 119 from the Prioritization Manager sub-system 117 that have a specified target priority value may be assigned to a particular pipeline (e.g., QA system pipeline 100A, 100B) in the QA system 100. As will be appreciated, the Prioritization Manager sub-system 117 may use the question queue 118 as a message queue to provide an asynchronous communications protocol for delivering prioritized questions 119 to the QA system 100. Consequently, the Prioritization Manager sub-system 117 and QA system 100 do not need to interact with a question queue 118 at the same time by storing prioritized questions in the question queue 118 until the QA system 100 retrieves them. In this way, a wider asynchronous network supports the passing of prioritized questions 119 as messages between different QA system pipelines 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager sub-system 117 may be configured to convert over-subscribing questions into asynchronous responses, even if they were asked in a synchronized fashion.

The QA system 100 may include one or more QA system pipelines 100A, 100B, each of which includes a computing device 104 comprising one or more processors and one or more memories. The QA system pipelines 100A, 100B may likewise include potentially any other computing device elements generally known in the art including buses, storage devices, communication interfaces, and the like. In various embodiments, these computing device elements may be implemented to process questions received over the network 140 from one or more content creator and/or users 130 at computing devices (e.g., 150, 152, 154, 156, 158, 162). In certain embodiments, the one or more content creator and/or users 130 are connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable QA generation functionality for one or more content users 130. Other embodiments of QA system 100 may be used with components, systems, sub-systems, and/or devices other than those that are depicted herein.

In each QA system pipeline 100A, 100B, a prioritized question 119 is received and prioritized for processing to generate an answer 120. In sequence, prioritized questions 119 are de-queued from the shared question queue 118, from which they are de-queued by the pipeline instances for processing in priority order rather than insertion order. In selected embodiments, the question queue 118 may be implemented based on a "priority heap" data structure. During processing within a QA system pipeline (e.g., 100A, 100B), questions may be split into multiple subtasks, which run concurrently. In various embodiments, a single pipeline instance may process a number of questions concurrently, but only a certain number of subtasks. In addition, each QA system pipeline 100A, 100B may include a prioritized queue (not shown) to manage the processing order of these subtasks, with the top-level priority corresponding to the time that the corresponding question started (i.e., earliest has highest priority). However, it will be appreciated that such internal prioritization within each QA system pipeline 100A, 100B may be augmented by the external target priority values generated for each question by the Question Priority Manager sub-system 114 to take precedence, or ranking priority, over the question start time. In this way, more important or higher priority questions can "fast track" through a QA system pipeline 100A, 100B if it is busy with already-running questions.

In the QA system 100, the knowledge manager 104 may be configured to receive inputs from various sources. For example, knowledge manager 104 may receive input from the question prioritization system 110, network 140, a knowledge base or corpus of electronic documents 107 or other data, semantic data 108, content creators, and/or users 130, and other possible sources of input. In selected embodiments, some or all of the inputs to knowledge manager 104 may be routed through the network 140 and/or the question prioritization system 110. The various computing devices (e.g., 150, 152, 154, 156, 158, 162) on the network 140 may include access points for content creators and/or users 130. Some of the computing devices may include devices for a database storing a corpus of data as the body of information used by the knowledge manager 104 to generate answers to cases. The network 140 may include local network connections and remote connections in various embodiments, such that knowledge manager 104 may operate in environments of any size, including local (e.g., a LAN) and global (e.g., the Internet). Additionally, knowledge manager 104 serves as a front-end system that can make available a variety of knowledge extracted from or represented in documents, network-accessible sources and/or structured data sources. In this manner, some processes populate the knowledge manager, with the knowledge manager also including input interfaces to receive knowledge requests and respond accordingly.

In one embodiment, a content creator 130 creates content (e.g., a document) in a knowledge base 106 for use as part of a corpus of data used in conjunction with knowledge manager 104. In selected embodiments, the knowledge base 106 may include any file, text, article, or source of data (e.g., scholarly articles, dictionary definitions, encyclopedia references, and the like) for use by the knowledge manager 104. Content users 130 may access the knowledge manager 104 via a network connection or an Internet connection to the network 140, and may input questions to the knowledge manager 104 that may be answered by the content in the corpus of data.

As further described below, when a process evaluates a given section of a document for semantic content, the process can use a variety of conventions to query it from the knowledge manager 104. One convention is to send a well-formed question. As used herein, semantic content broadly refers to content based upon the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager 104. In various embodiments, the knowledge manager 104 may interpret the question and provide a response to the content user containing one or more answers to the question. In some embodiments, the knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 119 and the language used in each of the portions of the corpus of data found during the application of the queries using a variety of reasoning algorithms. There may be hundreds or even thousands of reasoning algorithms applied, each of which performs different analysis (e.g., comparisons), and generates a score. For example, certain reasoning algorithms may look at the matching of terms and synonyms within the language of the input question and the found portions of the corpus of data. Other reasoning algorithms may look at temporal or spatial features in the language, while yet others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 120 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 150 to large mainframe systems, such as mainframe computer 158. Examples of handheld computer 150 include personal digital assistants (PDAs), personal entertainment devices, such as MP3 players, portable televisions, and Compact Disc players. Other examples of information processing systems include pen, or tablet, computer 152, laptop, or notebook, computer 154, personal computer system 156, server 162, and mainframe computer 158.

As shown, the various information processing systems can be networked together using computer network 140. Types of computer network 140 that can be used to interconnect the various information processing systems include PANs, LANs, Wireless Local Area Networks (WLANs), the Internet, the PSTN, other wireless networks, and any other network topology that can be used to interconnect the information processing systems.

Figure 2:
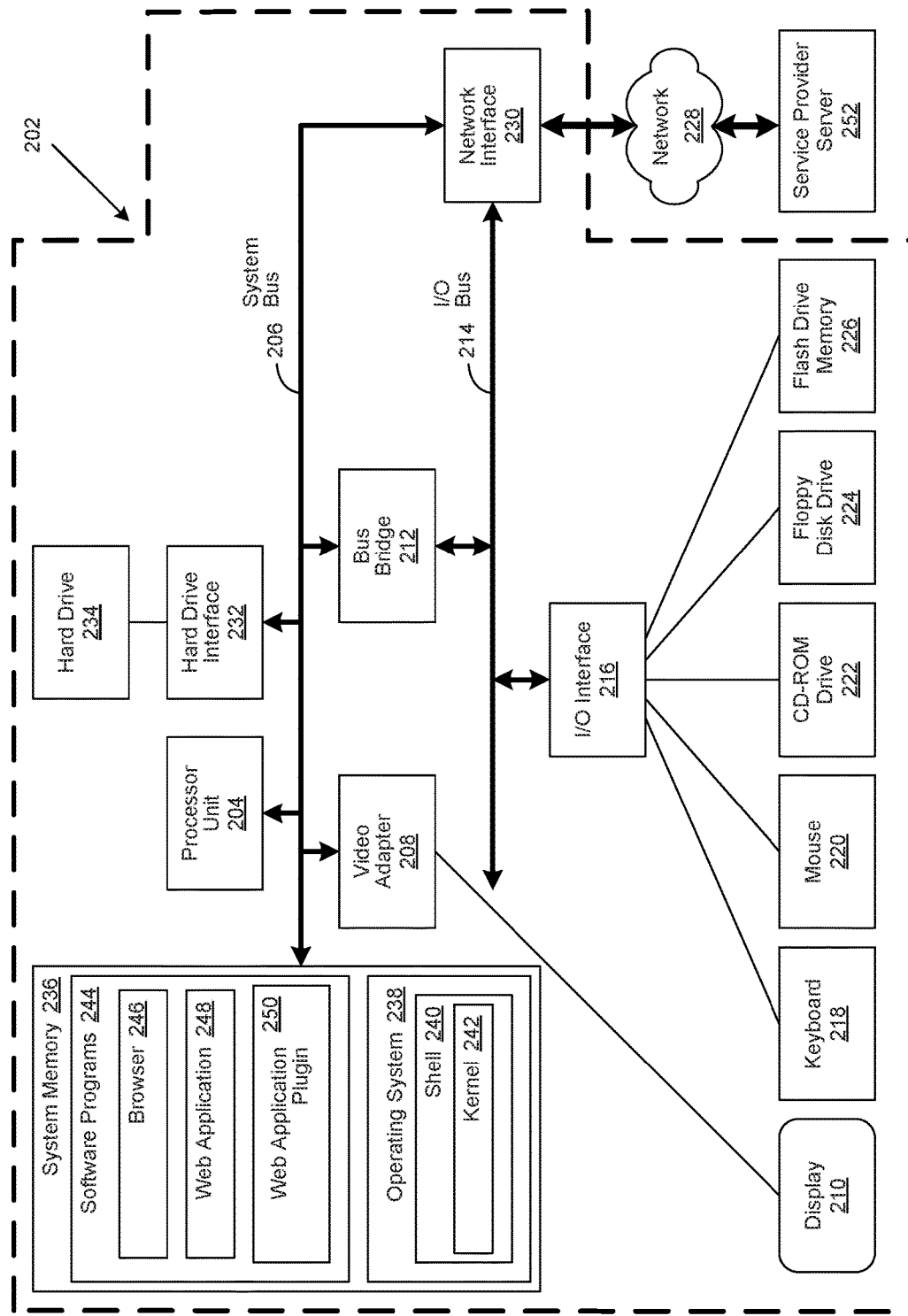
FIG. 2 shows a simplified block diagram of an information processing system capable of performing computing operations.

In selected embodiments, the information processing systems include nonvolatile data stores, such as hard drives and/or nonvolatile memory. Some of the information processing systems may use separate nonvolatile data stores. For example, server 162 utilizes nonvolatile data store 160, and mainframe computer 158 utilizes nonvolatile data store 160. The nonvolatile data store can be a component that is external to the various information processing systems or can be internal to one of the information processing systems. An illustrative example of an information processing system showing an exemplary processor and various components commonly accessed by the processor is shown in FIG. 2.

In various embodiments, the QA system 100 is implemented to receive a variety of data from various computing devices (e.g., 150, 152, 154, 156, 158, 162) and data sources 166, which in turn is used to perform QA operations described in greater detail herein. In certain embodiments, the QA system 100 may receive a first set of information from a first computing device (e.g., laptop computer 154). The QA system 100 then uses the first set of data to perform QA processing operations resulting in the generation of a second set of data, which in turn is provided to a second computing device (e.g., server 162). In response, the second computing device may process the second set of data to generate a third set of data, which is then provided back to the QA system 100. In turn, the QA system may perform additional QA processing operations on the third set of data to generate a fourth set of data, which is then provided to the first computing device.

In certain embodiments, a first computing device (e.g., server 162) may receive a first set of data from the QA system 100, which is then processed and provided as a second set of data to another computing device (e.g., mainframe 158). The second set of data is processed by the second computing device to generate a third set of data, which is provided back to the first computing device. The second computing device then processes the third set of data to generate a fourth set of data, which is then provided to the QA system 100, where it is used to perform QA operations described in greater detail herein.

In one embodiment, the QA system may receive a first set of data from a first computing device (e.g., handheld computer/mobile device 150), which is then used to perform QA operations resulting in a second set of data. The second set of data is then provided back to the first computing device, where it is used to generate a third set of data. In turn, the third set of data is provided back to the QA system 100, which then provides it to a second computing device (e.g., mainframe computer 158), where it is used to perform post processing operations.

As an example, a content user 130 may ask the question, "I'm looking for a good pizza restaurant nearby." In response, the QA system 100 may provide a list of three such restaurants in a half mile radius of the content user. In turn, the content user 130 may then select one of the recommended restaurants and ask for directions, signifying their intent to proceed to the selected restaurant. In this example, the list of recommended restaurants, and the restaurant the content user 130 selected, would be the third set of data provided to the QA system 100. To continue the example, the QA system 100 may then provide the third set of data to the second computing device, where it would be processed to generate a database of the most popular restaurants, by classification, location, and other criteria.

In various embodiments, the exchange of data between various computing devices (e.g., 150, 152, 154, 156, 158, 162) results in more efficient processing of data as each of the computing devices can be optimized for the types of data it processes. Likewise, the most appropriate data for a particular purpose can be sourced from the most suitable computing device (e.g., 150, 152, 154, 156, 158, 162), or data source 166, thereby increasing processing efficiency. Skilled practitioners of the art will realize that many such embodiments are possible and that the foregoing is not intended to limit the spirit, scope or intent of the invention.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disc-Read-Only Memory (CD-ROM) drive 222, a floppy disk drive 224, and a flash drive memory 226. The format of the ports connected to I/O interface 216 may be any known to those skilled in the art of computer architecture, including, but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and one or more web applications 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include a plug-in 250 respectively associated with the web application 248. In these and other embodiments, the web application 248 and corresponding plug-in 250 include code for implementing the processes described hereinbelow. In one embodiment, the information processing system 202 is able to download the web application 248 and plug-in 250 from a service provider server 252.

The hardware elements depicted in the information processing system 202 are not intended to be exhaustive, but rather are representative to highlight components used by the present invention. For instance, the information processing system 202 may include alternate memory storage devices such as magnetic cassettes, DVDs, Bernoulli cartridges, and the like. These and other variations are intended to be within the spirit, scope and intent of the present invention.

Figure 3:
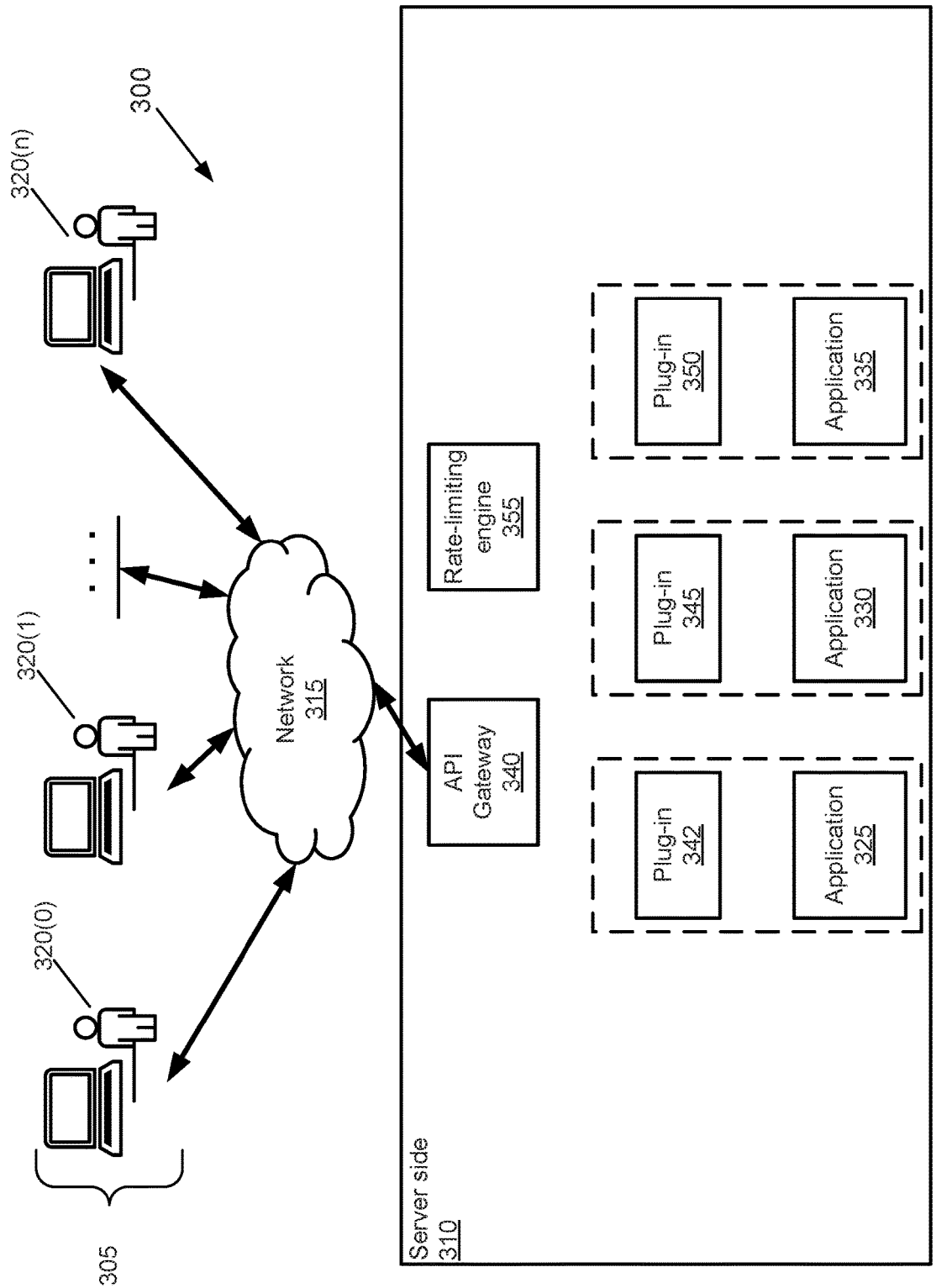
FIG. 3 depicts a simplified block diagram of one embodiment of a system implementing application aware rate-limiting.

FIG. 3 depicts a simplified block diagram of one embodiment of a system implementing application aware rate-limiting. In certain embodiments, the system 300 includes a client side 305 that communicates with a server side 310 over a network 315, such as the Internet. On the client side, there is a plurality of client entities 320(0) through 320(n), where "n" is an integer index. Client entities 320(0) through 320(n) submit requests to one or more web applications 325, 330, and 335 on the server side 310 and receive responses to those requests at the client side 305. Each web application 325, 330, and 335 is associated with a respective plug-in 342, 345, and 350, described in further detail herein. The server side 310 may also include a rate-limiting engine 355 and an API gateway 340, both of which are described in further detail herein. In certain embodiments, the rate-limiting engine 355 may be included in the API gateway 340. It will be recognized that the number and type of web applications are a matter of design choice.

Communications between client entities and servers in a large network such as the Internet involve a number of steps and protocols. Servers may host web applications, such as web applications 325, 330 and 335, that respond to requests made by the client entities 320(0 . . . n). In certain examples, communications between client entities 320(0 . . . n) and the server side 310 use the Transmission Control Protocol (TCP) for handling transport of requests for the web applications 325, 330, and 335. In certain embodiments, requests transmitted by the 320(0 . . . n) are encapsulated in a TCP stack that includes transport identifiers, such as IP addresses and headers. In certain embodiments, the incoming requests provided to the API gateway 340 are encapsulated in one or more such transport layers. In certain embodiments, the API gateway 340 forwards the requests for further processing after removing all of the transport layers. In certain embodiments, the API gateway 340 forwards the requests for further processing after removing less than all of the transport layers.

In certain embodiments, communications with the web applications 325, 330, and 335 take place at the application level. In certain embodiments, communications with the plug-ins 342, 345, and 350 also take place at the application level. In certain embodiments, communications between the rate-limiting engine 355, plug-ins 342, 345, and 350, and web applications 325, 330, and 335 also take place at the application level.

In certain embodiments, HTTP may be used for communications at the application level. HTTP is a protocol defining how messages are formatted and transmitted and includes commands for interacting with web applications. HTTP is referred to as a stateless protocol because each command is executed independently, without knowledge of the commands that came before it.

In certain embodiments, requests for one or more of the web applications 325, 330, and 335 are received from the network 315 at API gateway 340. The various functional blocks shown in FIG. 3 communicate with one another over one or more communication channels that are dependent on the rate-limiting state existing at the server side 310. As used herein, a communication channel is any hardware or software establishing a connection for transfer of information between one or more of the functional blocks.

Figure 4:
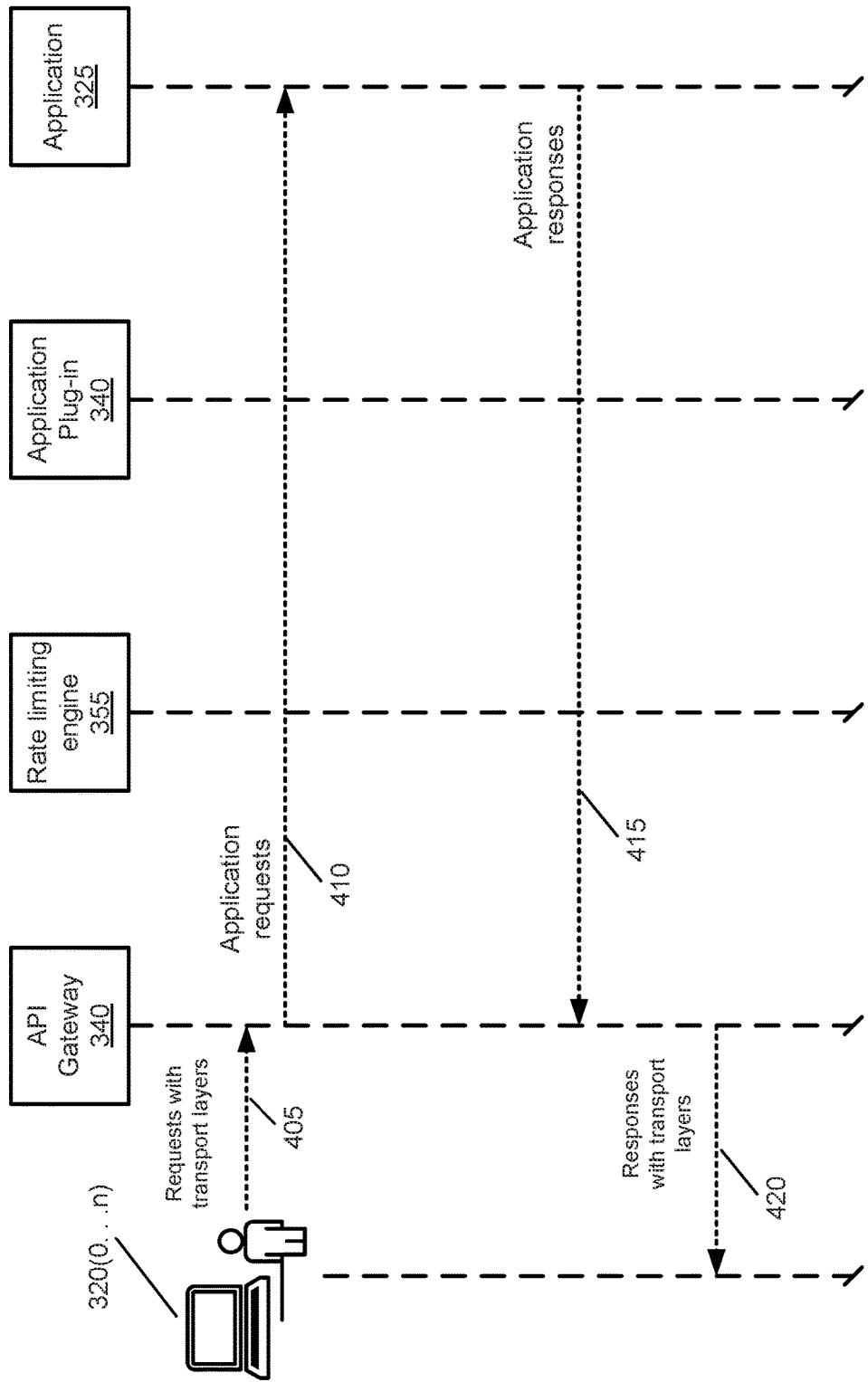
FIG. 4 is a flow diagram depicting one manner in which the various functional blocks communicate during normal operation without rate-limiting.

FIG. 4 is a flow diagram depicting one manner in which the various functional blocks communicate when the requests for a web application are not limited. In certain embodiments in which the system 300 is not executing rate-limiting operations, the API gateway 340 removes all of the transport layers and forwards requests received from the network 315 directly to the destination web application 325, 330, and 335 at the application level. Here, the web application requests are forward to web application 325 at operation 410. For simplicity, operations are described with respect to one or more entities 320(0 . . . n), web application 325, and plug-in 342. However, it will be appreciated that similar operations may be executed with respect to any web applications hosted at the server side 310, such as web applications 330 and 335, and plug-ins 345 and 350.

In certain embodiments, requests for web application 325 are submitted from one or more entities at operation 405 and are directed to API gateway 340. In certain embodiments, the requests for the web application 325 at operation 405 are each encapsulated within one or more transport layers. In certain embodiments, the API gateway 340 removes the transport layers before sending the requests to the web application 325 at the application level. In certain embodiments, the requests to the web application 325 bypass the rate-limiting engine 355 and application plug-and 342. Once the web application 325 receives the requests, the web application 325 responds to the requests and passes the responses to the API gateway 340 at operation 415. In certain embodiments, the API gateway 340 encapsulates the responses within one or more transport layers and provides the responses to the requesting entities at operation 420. It will be recognized that intermediate layers of network functionality may exist to facilitate communications between the API gateway 340 and the entities 320(0 . . . n). Such intermediate layers have been omitted for simplicity and are not particularly pertinent to the disclosed system.

Figure 5:
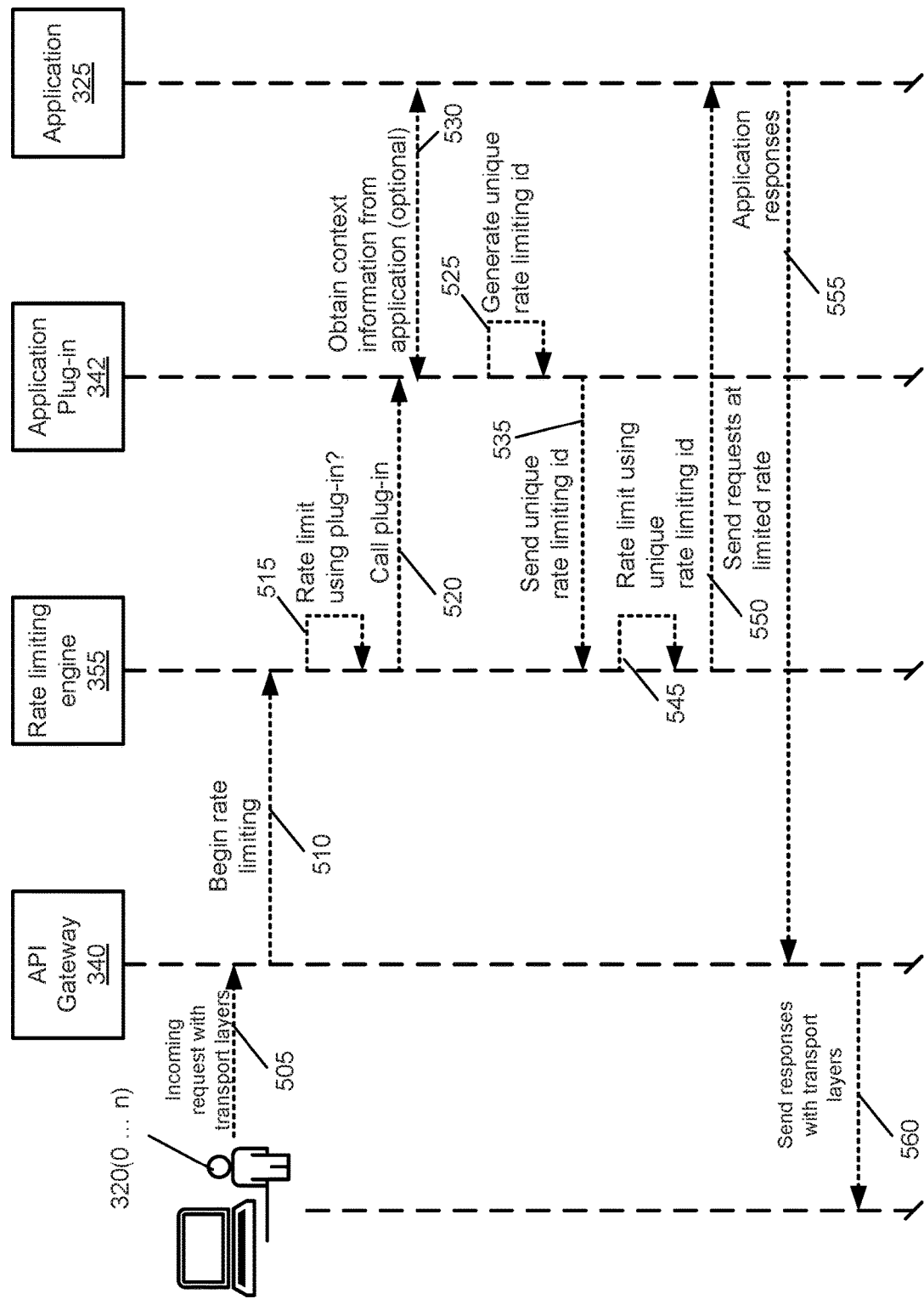
FIG. 5 is a flow diagram depicting one manner in which the various functional blocks communicate during set up of rate-limiting.

FIG. 5 is a flow diagram depicting one manner in which the various functional blocks communicate during set up of rate-limiting. In this example, requests for web application 325 are submitted from one or more entities 320(0 . . . n) and are directed to API gateway 340 at operation 505. In certain embodiments, the requests for the web application 325 at operation 505 have been encapsulated within one or more transport layers. In certain embodiments, the API gateway 340 may remove one or more of the transport layers before forwarding the requests for ultimate receipt by the web application 325 at the application level.

The API gateway 340 may determine that incoming communications must be rate-limited and notify the rate-limiting engine 355 to initiate rate-limiting at operation 510. In certain embodiments, the rate-limiting engine 355 is part of the API gateway 340. In certain embodiments, the rate-limiting engine 355 is a separate component but communicates with the API gateway 340. For purposes of this disclosure, the rate-limiting engine 355 is described in the context of communications with other components operating at the server side 310 regardless of where the functionality of the rate-limiting engine 355 resides.

In certain embodiments, the rate-limiting engine 355 responds to the notification provided at operation 510 by determining whether requests for the one or more of the web applications, such as web application 325, are to be rate-limited. In certain embodiments, the determination of whether requests for the web application 325 are to be rate-limited is made by the rate-limiting engine 355 at operation 515. In certain embodiments, the API gateway 340 makes the determination and includes that determination in the notification information provided at operation 510. If the requests are to be rate-limited, the rate-limiting engine 355 calls the application plug-in 342 for the web application that is to be rate-limited, such as web application 325, at operation 520. In certain embodiments, the rate-limiting engine 355 exposes an interface for communication with the application plug-in 342 using a traditional library, an OSGI plug-in interface, or uploaded Java script snippet. In certain embodiments, a contract is established between the rate-limiting engine 355 and application plug-ins 342, 345, and 350. In certain embodiments, the application plug-ins 342, 345, and 350 are implemented as Java script code.

In certain embodiments in which requests to the web application 325 are to be rate-limited, the rate-limiting engine 355 invokes plug-in 342 at operation 520 to obtain a rate-limiting identifier from the plug-in 342. The rate-limiting identifier may be generated by the application plug-in 342 at operation 525 and sent to the rate-limiting engine at operation 535. The rate-limiting identifier uniquely identifies the web application 325 and is used by the rate-limiting engine 355 to rate-limit requests to the web application 325 at the application level. The rate-limiting identifier is used by the rate-limiting engine 325 as a "key" against which rate-limiting algorithms are applied. In certain embodiments, such rate-limiting algorithms may be based on conventional rate-limiting techniques.

The rate-limiting identifier is selected so that it uniquely identifies web application 325 to distinguish web application 325 from other web applications, such as web applications 330 and 335, for the purposes of rate-limiting. In certain embodiments, the plug-in 342 generates a hash value as the rate-limiting identifier for the web application 325. In certain embodiments, the hash value is not a literal string hashing of the incoming requests, but a hash value produced programmatically by a piece of code that the administrator of the API gateway 340 can choose to implement. In certain embodiments, the use of a unique hash value to uniquely identify web applications allows the rate-limiting engine 355 to apply traditional rate-limiting algorithms against "application awareness of a request" rather than statically against a piece of data in the request (i.e., the client IP or header). In certain embodiments, the hash value may be generated from data that is not directly present in the web application requests. In certain embodiments, the hash value may be generated using data in a refresh token that is presented as a handle into a database which has a consistent ID. In certain embodiments, the hash value may be generated from that database ID.

In certain embodiments, the web application plug-in 342 may obtain context information from the web application 325 at operation 530. Such context information may include initialization data or other fixed value data used by the web application 325. In certain embodiments, the initialization data may include configuration files in various configuration formats, such as text or XML.

At operation 545, the rate-limiting engine 355 uses the rate-limiting identifier for web application 325 to rate-limit requests sent to the web application 325. In certain embodiments, the rate-limiting engine 335 caches requests for web application 325 during the rate-limiting set up and provides the cached requests to the web application 325 at the rate-limit at operation 550. The web application 325 provides responses to the requests at operation 555 to the API gateway 340, which may encapsulate the response in one or more transport layers pursuant to providing the responses to the requesting entities 320(0 . . . n) at operation 560.

Figure 6:
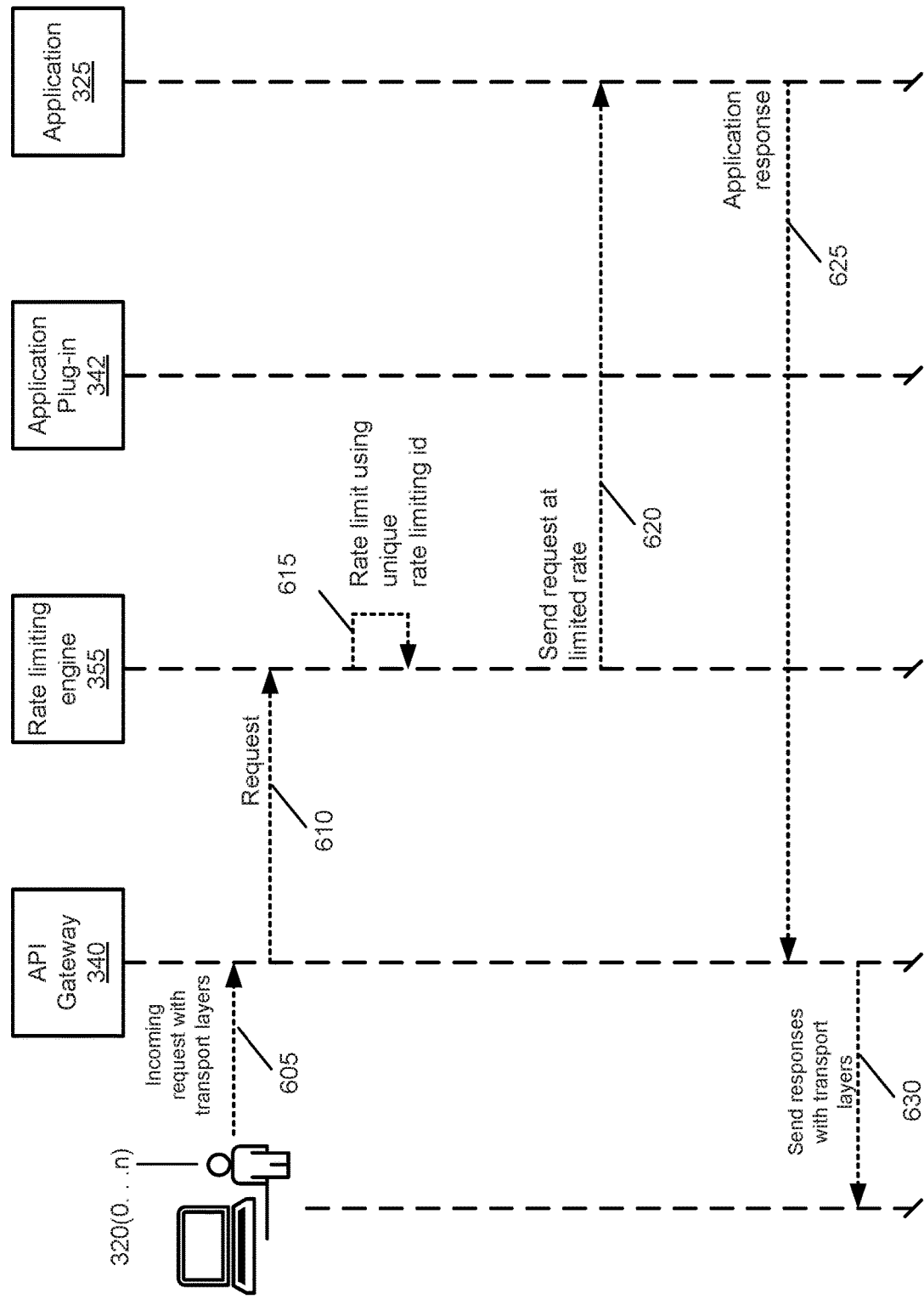
FIG. 6 is a flow diagram depicting one manner in which the various functional blocks communicate during rate-limiting.

FIG. 6 is a flow diagram depicting one manner in which the various functional blocks communicate while rate-limiting requests to web applications, such as web application 325. In certain embodiments, requests for the web application 325 are received at the API gateway 340 at operation 605. In certain embodiments, the requests received at the API gateway 340 have been encapsulated within one or more transport layers. In certain embodiments, the API gateway 340 removes one or more of the transport layers and passes the request to the rate-limiting engine 355 at operation 610. At operation 615, the rate-limiting engine 355 determines which web application 325, 330, or 335 is to receive the request and uses the unique rate-limiting identifiers to send the requests to the web application having the rate-limiting identifier at the web application's rate-limit at operation 620. In certain embodiments, the rate-limiting engine 355 uses the same rate-limit for all rate-limited web applications. In certain embodiments, the rate-limiting engine 355 uses different rate-limits for different web applications. In certain embodiments, the rate-limiting engine 355 rate-limits requests to all of the web applications running at the server side 310. In certain embodiments, the rate-limiting engine 355 only rate-limits requests to web applications that have been selected for rate-limiting. In certain embodiments, the rate-limiting engine 355 only rate-limits requests to web applications that have been selected by the API gateway 340 or rate-limiting engine 355 for rate-limiting.

In certain embodiments, the web application 325 generates responses to the requests and sends the responses to the API gateway 340 at operation 625. In certain embodiments, the API gateway 340 encapsulates the responses in one or more transport layers pursuant to providing the responses to the requesting entities 320(0 . . . n) at operation 630.

Figure 7:
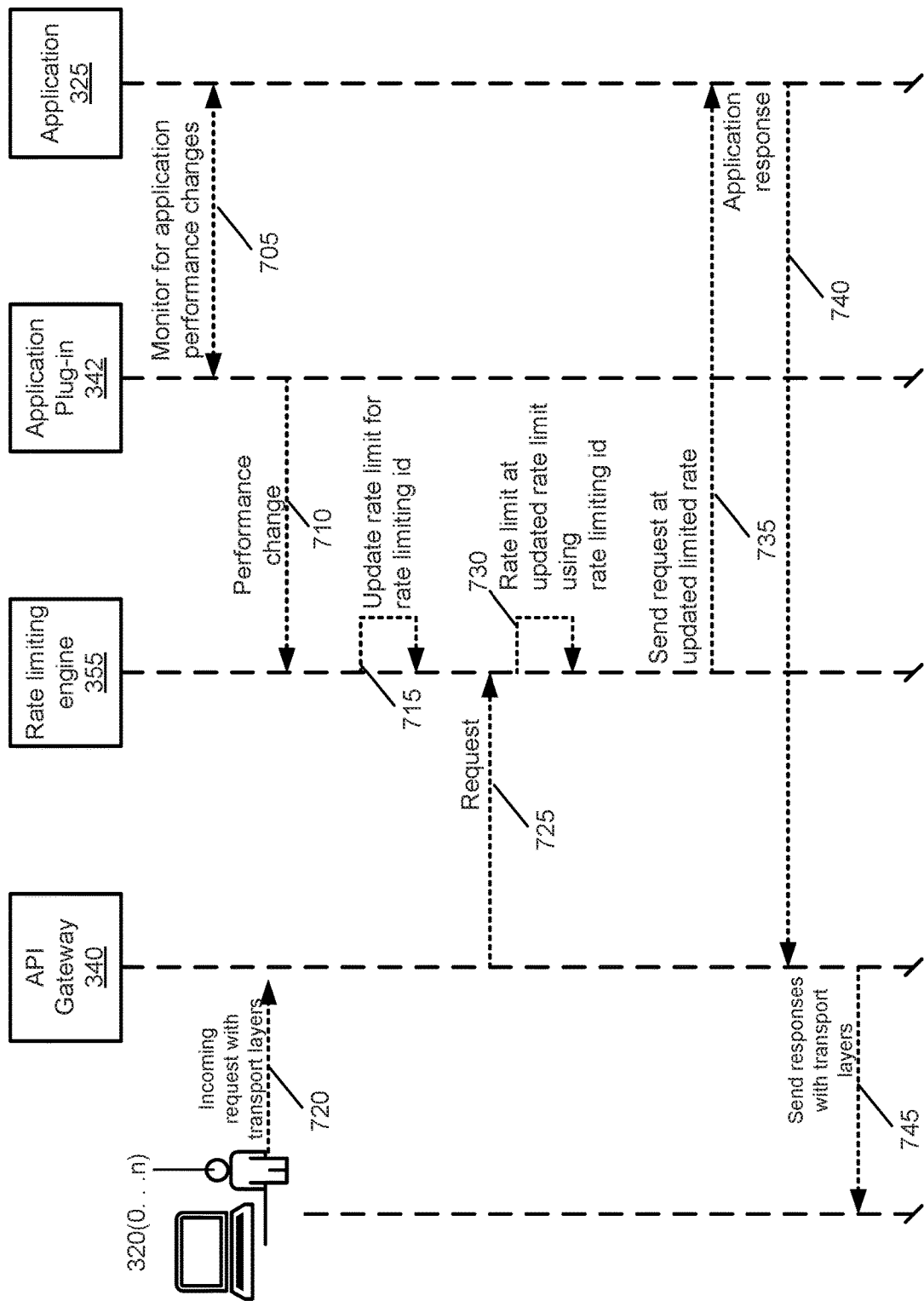
FIG. 7 is a flow diagram depicting one manner in which the various functional blocks may communicate in response to changes in application performance parameters.

FIG. 7 is a flow diagram depicting one manner in which the various functional blocks may communicate in response to changes in performance parameters of a web application, such as web application 325. In certain embodiments, the application plug-in 342 monitors the web application 325 for performance changes at operation 705. In certain embodiments, the performance parameters monitored by the application plug-in 342 include the rate at which the web application 325 provides responses to the requests. In certain embodiments, low response rates may indicate the need for a reduction in the rate-limit for the web application 325. In certain embodiments, high response rates may indicate that the rate-limit for the web application 325 may be increased or that rate-limiting is no longer required for the web application 325.

In certain embodiments, the performance parameters monitored by the application plug-in 342 include key completion indicators. In certain embodiments, key completion indicators are checkpoints introduced inside a web application to indicate a level of completion of certain operations within the web application. In certain embodiments, the rate-limit for the web application 325 may be reduced or blocked when the key completion indicators show that responses to requests are being held up at one or more web application operations. In certain embodiments, the rate-limiting engine 355 may block all requests for web application operations that are being held up as indicated by the key completion indicators.

In certain embodiments, the application plug-in 342 notifies the rate-limiting engine 355 of the performance change at operation 710. At operation 715, the rate-limiting engine 355 may use the performance change information provided by the application plug-in 342 to update the rate-limit for the rate-limiting identifier of the web application 325.

In certain embodiments, requests for the web applications, such as web application 325, are received at the API gateway 340 at operation 720. In certain embodiments, the requests received at the API gateway 340 have been encapsulated within one or more transport layers. In certain embodiments, the API gateway 340 removes one or more of the transport layers and passes the request to the rate-limiting engine 355 at operation 725. At operation 730, the rate-limiting engine 355 uses the updated rate-limit associated with the rate-limiting identifier for web application 325 to send the requests to the web application 325 (operation 735) at the web application's rate-limit. In certain embodiments, the rate-limiting engine 355 uses the same rate-limit for all rate-limited web applications. In certain embodiments, the rate-limiting engine 355 uses different rate-limits for different web applications. In certain embodiments, the rate-limiting engine 355 rate-limits requests to all of the web applications running at the server side 310.

In certain embodiments, the rate-limiting engine 355 only rate-limits requests to web applications that have been selected for rate-limiting. In certain embodiments, the rate-limiting engine 355 only rate-limits requests to web applications that have been selected by the API gateway 340 or rate-limiting engine 355 for rate-limiting.

In the example shown in FIG. 7, the web application 325 sends the response to the request to the API gateway 340 at operation 740. At operation 745, the API gateway 340 may encapsulate the response in one or more transport layers pursuant to providing the request to the requesting entity.

Although the present invention has been described in detail, it should be understood that various changes, substitutions and alterations can be made hereto without departing from the spirit and scope of the invention as defined by the appended claims.

What is claimed is:

1. A computer-implemented method for performing application aware rate-limiting, comprising:
   receiving requests for a plurality of web applications executing at a server from a plurality of client entities;
   determining whether requests received for a given web application are to be rate-limited;
   when the received requests for the given web application are to be rate-limited, requesting, by a rate-limiting engine, a rate-limiting identifier from a web application plug-in respectively associated with the given web application;
   generating the rate-limiting identifier at the web application plug-in, wherein the rate-limiting identifier is unique to the given web application;
   sending the rate-limiting identifier from the web application plug-in associated with the given web application to the rate-limiting engine; and
   using the rate-limiting identifier at the rate-limiting engine to rate-limit passing of the received requests to the given web application independent of rate-limiting occurring for other web applications of the plurality of web applications.

2. The computer-implemented method of claim 1, further comprising:
   receiving a plurality of data streams from the plurality of client entities at a API gateway, wherein the plurality of data streams include requests that are to be passed to the plurality of web applications;

determining, by the API gateway, whether one or more of the data streams to the given web application should be rate-limited;

wherein, if one or more of the plurality of data streams to the given web application are to be rate-limited, the API gateway notifies the rate-limiting engine that one or more of the plurality of data streams to the given web application are to be rate-limited; and wherein, in response to the notification from the API gateway, the rate-limiting engine executes operations including requesting the rate-limiting identifier from the web application plug-in respectively associated with the given web application.

3. The computer-implemented method of claim 1, wherein the rate-limiting identifier comprises a hash tag, wherein the hash tag is unique to the web application.

4. The computer-implemented method of claim 1, wherein the rate-limiting identifier is independent of data in the received requests.

5. The computer-implemented method of claim 1, wherein the web application plug-in requests application context from the web application before sending the rate-limiting identifier to the rate-limiting engine.

6. The computer-implemented method of claim 1, wherein
the web application plug-in provides data to the rate-limiting engine for use in determining a rate-limit for the requests for the web application;
wherein the web application plug-in monitors performance parameters of the web application during rate-limiting by the rate-limiting engine to determine whether the rate-limit should be changed; and
wherein, if the web application plug-in determines that the rate-limit should be changed, the plug-in notifies the rate-limiting engine.

7. The computer-implemented method of claim 1, further comprising:
when the received requests to one or more of the web applications are to be rate-limited, using a rate-limiting engine to request rate-limiting identifiers from web application plug-ins respectively associated with each of the multiple web applications that are to be rate-limited;
generating the rate-limiting identifiers at each of the respective web application plug-ins, wherein each rate-limiting identifier generated by each web application plug-in is unique to the respective web application;
sending the rate-limiting identifiers from the respective web application plug-ins to the rate-limiting engine; and
rate-limiting requests received for each of the multiple web applications that are to be rate-limited using the rate-limiting identifiers provided from the respective web application plug-ins so that the rate-limiting engine rate-limits requests to a web application of the plurality of web applications independent of rate-limiting of other web applications of the plurality of web applications.

8. A system comprising:
a processor;
a data bus coupled to the processor; and
a computer-usable medium embodying computer program code, the computer-usable medium being coupled to the data bus, the computer program code used for performing application aware rate-limiting operations and comprising instructions executable by the processor and configured for:
receiving requests for a plurality of web applications executing at a server from a plurality of client entities;
determining whether requests received for a given web application are to be rate-limited;
when the received requests for the given web application are to be rate-limited, requesting, by a rate-limiting engine, a rate-limiting identifier from a web application plug-in respectively associated with the given web application;
generating the rate-limiting identifier at the web application plug-in, wherein the rate-limiting identifier is unique to the given web application;
sending the rate-limiting identifier from the web application plug-in associated with the given web application to the rate-limiting engine; and
using the rate-limiting identifier at the rate-limiting engine to rate-limit passing of the received requests to the given web application independent of rate-limiting occurring for other web applications of the plurality of web applications.

9. The system of claim 8, wherein the instructions a further configured for:
receiving a plurality of data streams from the plurality of client entities at a API gateway, wherein the plurality of data streams include requests that are to be passed to the plurality of web applications;
determining, by the API gateway, whether one or more of the data streams to the given web application should be rate-limited;
wherein, if one or more of the plurality of data streams to the given web application are to be rate-limited, the API gateway notifies the rate-limiting engine that one or more of the plurality of data streams to the given web application are to be rate-limited; and
wherein, in response to the notification from the API gateway, the rate-limiting engine executes operations including requesting the rate-limiting identifier from the web application plug-in respectively associated with the given web application.

10. The system of claim 8, wherein the rate-limiting identifier comprises a hash tag, wherein the hash tag is unique to the web application.

11. The system of claim 8, wherein the rate-limiting identifier is independent of data in the received requests.

12. The system of claim 8, wherein the web application plug-in requests application context from the web application before sending the rate-limiting identifier to the rate-limiting engine.

13. The system of claim 8, wherein
the web application plug-in provides data to the rate-limiting engine for use in determining a rate-limit for the requests for the web application;
wherein the web application plug-in monitors performance parameters of the web application during rate-limiting by the rate-limiting engine to determine whether the rate-limit should be changed; and
wherein, if the web application plug-in determines that the rate-limit should be changed, the web application plug-in notifies the rate-limiting engine.

14. The system of claim 8, wherein the instructions are further configured for:
when the received requests to one or more of the web applications are to be rate-limited, using a rate-limiting engine to request rate-limiting identifiers from web application plug-ins respectively associated with each of the multiple web applications that are to be rate-limited;

generating the rate-limiting identifiers at each of the respective web application plug-ins, wherein each rate-limiting identifier generated by each web application plug-in is unique to the respective web application;

sending the rate-limiting identifiers from the respective web application plug-ins to the rate-limiting engine; and rate-limiting requests received for each of the multiple web applications that are to be rate-limited using the rate-limiting identifiers provided from the respective web application plug-ins so that the rate-limiting engine rate-limits requests to a web application of the plurality of web applications independent of rate-limiting of other web applications of the plurality of web applications.

15. A non-transitory, computer readable storage medium embodying computer program code, the computer program code comprising computer executable instructions configured for:

receiving requests for a plurality of web applications executing at a server from a plurality of client entities;

determining whether requests received for a given web application are to be rate-limited;

when the received requests for the given web application are to be rate-limited, requesting, by a rate-limiting engine, a rate-limiting identifier from a web application plug-in respectively associated with the given web application;

generating the rate-limiting identifier at the web application plug-in, wherein the rate-limiting identifier is unique to the given web application;

sending the rate-limiting identifier from the web application plug-in associated with the given web application to the rate-limiting engine; and using the rate-limiting identifier at the rate-limiting engine to rate-limit passing of the received requests to the given web application independent of rate-limiting occurring for other web applications of the plurality of web applications.

16. The non-transitory, computer-readable storage medium of claim 15, wherein the instructions are further configured for:

receiving a plurality of data streams from the plurality of client entities at a API gateway, wherein the plurality of data streams include requests that are to be passed to the plurality of web applications;

determining, by the API gateway, whether one or more of the data streams to the given web application should be rate-limited;

wherein, if one or more of the plurality of data streams to the given web application are to be rate-limited, the API gateway notifies the rate-limiting engine that one or more of the plurality of data streams to the given web application are to be rate-limited; and wherein, in response to the notification from the API gateway, the rate-limiting engine executes operations including requesting the rate-limiting identifier from the web application plug-in respectively associated with the given web application.

17. The non-transitory, computer-readable storage medium of claim 15, wherein the rate-limiting identifier comprises a hash tag, wherein the hash tag is unique to the web application.

18. The non-transitory, computer-readable storage medium of claim 15, wherein the rate-limiting identifier is independent of data in the received requests.

19. The non-transitory, computer-readable storage medium of claim 15, wherein the web application plug-in requests application context from the web application before sending the rate-limiting identifier to the rate-limiting engine.

20. The non-transitory, computer-readable storage medium of claim 15, wherein the instructions are further configured for:

when the received requests to one or more of the web applications are to be rate-limited, using a rate-limiting engine to request rate-limiting identifiers from web application plug-ins respectively associated with each of the multiple web applications that are to be rate-limited;

generating the rate-limiting identifiers at each of the respective web application plug-ins, wherein each rate-limiting identifier generated by each web application plug-in is unique to the respective web application;

sending the rate-limiting identifiers from the respective web application plug-ins to the rate-limiting engine; and rate-limiting requests received for each of the multiple applications that are to be rate-limited using the rate-limiting identifiers provided from the respective web application plug-ins so that the rate-limiting engine rate-limits requests to a web application of the plurality of web applications independent of rate-limiting of other web applications of the plurality of web applications.

* * * * *